United States Patent [19]

Herstek

[11] Patent Number: 5,655,985

[45] Date of Patent: Aug. 12, 1997

[54] GEAR SYSTEM, PARTICULARLY MULTISATELLITE GEAR SYSTEM

[76] Inventor: Jozef Herstek, Bartosovce 97, 086 42 Hertnik, Slovakia

[21] Appl. No.: 492,077

[22] PCT Filed: Dec. 30, 1993

[86] PCT No.: PCT/SK93/00006

§ 371 Date: Jun. 28, 1995

§ 102(e) Date: Jun. 28, 1995

[87] PCT Pub. No.: WO94/16243

PCT Pub. Date: Jul. 21, 1994

[30] Foreign Application Priority Data

Dec. 31, 1992 [CZ] Czech Rep. .......... PV 04050-92

[51] Int. Cl.⁶ .................................................... F10H 1/32
[52] U.S. Cl. .................................................... 475/179
[58] Field of Search ........................................ 475/178, 179

[56] References Cited

U.S. PATENT DOCUMENTS

| | | |
|---|---|---|
| 3,430,523 | 3/1969 | Merritt .................. 475/178 |
| 3,994,187 | 11/1976 | Milenkovic . |
| 4,567,790 | 2/1986 | Butterfield et al. .......... 475/179 |
| 4,594,915 | 6/1986 | Braren ..................... 475/178 |
| 4,690,010 | 9/1987 | Matsumoto et al. ........... 475/179 |
| 5,123,884 | 6/1992 | Kondoh et al. ............. 475/179 |

FOREIGN PATENT DOCUMENTS

470741 2/1992 European Pat. Off. .
2112631 9/1972 Germany .

*Primary Examiner*—Dirk Wright
*Attorney, Agent, or Firm*—Horst M. Kasper

[57] ABSTRACT

The invention relates to a gear system for transmission of rotary movements, more particularly a multisatellite gear system, with a driven gearwheel (1) with an internal toothing (2) which meshes with an external toothing (21) of at least one driving gearwheel (20), and with a slow-running crankshaft (6) which is rotarily mounted via slow-running bearings in the gearwheel (1). The crankshaft (6) has a left-hand and a right-hand flange (7, 8) with satellite openings (10). The flanges (7, 8) are non-rotarily interconnectable via axially extending connecting members (62). Rotarily mounted via their central portions (36) in the satellite openings (10) are planet wheel shafts (34). A central crankshaft (28) is mounted in the gearwheel (1). At least one gearwheel (20) with satellite openings (25) is mounted via its central opening (24) on the portion (29) of the central crankshaft (28). Crank portions (35) of the planet wheel shafts (34) are rotarily mounted in the satellite openings (25). (FIG. 1).

11 Claims, 10 Drawing Sheets

GEAR SYSTEM, PARTICULARLY MULTISATELLITE GEAR SYSTEM

The invention relates to a gear system for transmitting rotary movements according to the preamble to claim 1. The invention further relates to a differential gear system by means of which eccentric and rotary movements of a planet wheel are transformed into central rotary movements of a slow-running crankshaft.

Previous gear systems of this type solve the problem of r.p.m. reduction between a slow-running and a fast running crankshaft in two ways, i.e. by a central system and a planetary system. The central system comprises an internal gear wheel, which is Securely fixed to a gear casing, and a planet wheel with external teeth, which meshes with the internal teeth of said wheel. The central crankshaft is rotarily mounted with respect to the internal gear wheel via its central portion and by means of high-speed bearings, while the planet wheel is rotarily mounted on the portion in a central cylindrical opening. The planet wheel is provided on its peripheral side with cylindrical openings. Engaging with these openings are linings which are set upon cylindrical pins with a small degree of play. The cylindrical pins are axially integrally formed in the body of the slow-running crankshaft, on the same circle and at the same intervals as is the case with the eccentric cylindrical openings of the planet wheel. The slow-running crankshaft is rotarily and centrally mounted in the wheel. The following facts are regarded as drawbacks to the known central system:

The load on the pins in the gear system is not effective, as upon transmission of the torque from the planet wheel to the slow-running crankshaft only one half of the entire number of pins is ever loaded in the radial plane. Moreover, the irregular distribution of load on the individual pins results in a high concentrated load on the pins most frequently loaded, which leads to increased wear on the given pin and on the lining. In order to obtain sufficient load capacity, sufficient strength and sufficient life duration of the gear system, it is necessary to have large cross-sections and numbers of pins, the slow-running crankshaft also having to be robust, the pins being freely supported. The result is that the weight of the gear system is considerably and undesirably increased. In such a gear system the central crankshaft leads to disproportionate concentration of the load in the radial plane, because the crankshaft not only transmits the effective load originating from the power effect, but also a load which originates from the torque. The previous gear system, during starting and at low speeds, does not form a lubricant layer between the pins and the lining, so that in this working range the device operates with a semi-dry friction. Consequently the pins and the linings are subject to increased wear, undesirable heat being generated, and in addition operation is interrupted, which is regarded as the source of undesirable vibrations. In gear systems with a higher transmission ratio there is a reduction in the tangential speed of rotation of the linings at the pins. In this way the field of application of the single-stage gear system is restricted. In order to overcome this restriction it is appropriate to use two, three or a plurality of gear systems incorporated in series. The result of this however is that the degree of effectiveness of such a gear system is reduced. A further restriction experienced by the previous gear system lies in its positioning. In the transmission of rotary movements from the planet wheel to a slow-running crankshaft the achievement of a low degree of play in the transmission chain is problematic. Moreover, at low revolutions of the slow-running crankshaft, the semi-dry friction already mentioned occurs.

Planetary systems are formed from two integrated gearing stages incorporated in series. The first stage is provided with a conventional spur gearing with straight teeth. It further comprises a high-speed planet wheel, which meshes with two or with three externally toothed gear wheels. These are securely fixed to a crankshaft and are rotarily mounted in a slow-running crankshaft. The external toothing of the planet wheel co-operates with the internal toothing of the wheel. With respect to the gear wheel, a slow-running crankshaft is disposed in slow-running bearings. The crankshaft comprises a flange with axially extending connecting members disposed in a circle, and with an end plate, all of which are connected to the connecting members. The flange and the plate are provided with continuous cylindrical crank openings disposed in a circle, and with a continuous cylindrical opening for the fast running planet wheel. Located between the flange and the plate are a plurality of planet wheels, each planet wheel being provided with cylindrical crank openings disposed in a circle. Disposed on a further circle are continuous openings for connecting members with continuous cylindrical openings for the fast running planet wheel. Rotarily mounted in bearings in the continuous cylindrical crank openings of the slow-running crankshaft via central portions are crankshafts, whereupon a planet wheel is rotarily mounted in continuous crank openings on the eccentric portion of the crankshaft. Each crankshaft is disposed between two walls. Such a two-stage gear system, in which the first stage is formed by a planetary gear system and the second stage by a differential gear system, involves the advantage of r.p.m. reduction at the input of the second stage, but disadvantages originating from the toothing as such.

The first transmission stage (gear wheel intermediate gear):

The manufacture of gear wheels is complicated and cost-intensive, particularly at higher degrees of strength. The gear wheel intermediate gear is a source of vibration in a gear system, as the strength of the teeth is dependent on the position of the entrainment point. The gear wheel intermediate gear in addition has a lesser degree of efficiency and is regarded as a source of noise and stress on the crankshaft.

The second switch stage (differential):

Loading of the crankshafts in the radial plane is irregular and, during a rotation of the crankshaft the load on the crankshaft, changes from zero to maximum. At the same time the strength of the output portion of the gear system alters according to the formula (2×II/number of crankshafts). The alterations in the load on the crankshafts and the change in strength have a negative influence on the quiet running of the gear system.

Proceeding from the above prior art, the purpose underlying the invention is to provide assistance here.

The task proposed is fulfilled according to the invention by the features of Patent claim 1.

Located between both flanges are a plurality of planet wheels, which are provided with an external toothing and which are in engagement with the internal toothing of the gearwheel. In order to form a gearwheel pair, all types of spur gears may be used. Each planet wheel is provided with continuous cylindrical satellite openings which are disposed in a circle and are provided with passage openings and with a continuous cylindrical opening. A secure connection between the flanges of the slow-running crankshaft may be achieved in various ways, in the form of connecting members, variable connecting members and compact connecting members. The connecting members comprise a spacer lining, a fixing tube and a connecting screw which securely connects both flanges; at the same time it also connects the slow-running crankshaft with the driven unit. The fixing tube, with a slightly larger external circumference, is pressed into anchor apertures in both flanges and is simultaneously located in the opening of the spacer lining. In the other construction of the connecting member, the fixing tube and the anchor screw are replaced by a set screw. The compact connecting member is formed by a stop means with the profile of an intermediate segment of a circle, both flanges being connected to the stop means by means of a screw and a pin. An anchor screw is in addition provided. The external circumference of the spacer lining, and of the stop means upon which the planet wheel is mounted via its passage openings, can be in different forms. A factor relevant for the various constructions of the external circumference of the axial connecting members of the slow-running crankshaft is that they are dependent on the position and the shape of the passage openings in the planet wheel. This is on the one hand determined by the shape and the position of the external circumference of the axial connecting members, and on the other hand by the eccentric movements of the planet wheels, during which a minimum degree of play must be observed between the passage openings in the planet wheel and the external circumference of the axial connecting members of the slow-running crankshaft. Before connection of the gear system to a driven unit, the slow-running crankshaft is retained in a compact state by screws. A factor relevant for both flanges of the slow-running crankshaft and for the planet wheel is that the satellite apertures of both flanges and the satellite openings of the planet wheel lie on identical circles with uniform distribution, the passage openings between two satellite apertures of the planet wheel and the connecting members of the slow-running crankshaft being located in a circle between two satellite apertures of the flanges. A relevant factor for both flanges of the slow-running crankshaft and the planet wheels is that the satellite openings of both flanges and the satellite openings of the planet wheels lie on identical circles and are uniformly distributed on the circles. Thus the passage openings of the planet wheel are disposed between two satellite openings of the planet wheel, while the connecting member of the slow-running crankshaft is disposed in a circle between two satellite apertures of the respective flange. Rotarily mounted in the satellite apertures of the slow-running crankshaft are planet wheel shafts, i.e. at both their ends and in central bearings of the planet wheel shaft. Simultaneously, with respect to the wheel, the central crankshaft is also rotarily mounted, i.e. internally or externally. Internally, the crankshaft is mounted in central bearings of the central crankshaft, i.e. at both ends in central apertures of the left-hand and of the right-hand flange. Externally it is mounted by being set on the crankshaft of the rotor of the driven unit, which has its own bearing system. The eccentric bearing eliminates one or both central bearings of the central crankshaft. At the portion of the central crankshaft, the planet wheel is rotarily mounted in the central opening, in crank bearings of the central crankshaft, whereas the portions of the satellite crank bearings are mounted in satellite apertures of the planet wheel, i.e. in crank bearings of the planet wheel shafts. The eccentricity of the central crankshaft and the eccentricity of the planet wheel shafts are identical in a radial cutting plane, this eccentricity corresponding to the spacing between the axes of the gearwheel pair, which is defined by the gearwheel and by the planet wheel. The multisatellite gear system can have its own intermediate gear for r.p.m. reduction of the central crankshaft. The gear system has a fast-running planet wheel which co-operates with the satellite gearwheels. The satellite gearwheels are rotarily mounted by satellite bearings on pins of the entrainment means, which are securely connected to the central crankshaft. The satellite gearwheels co-operate with ring gearwheels which are securely connected to the right-hand flange of the slow-running crankshaft.

By means of these measures there is obtained an appropriate distribution of load at which the central crankshaft transmits only the power effect, while the planet wheel shafts transmit only the torque from the toothing. In this way, during a revolution and constant torque loading of the slow-running crankshaft, a linear loading of the central crankshaft and of the planet wheel shaft are achieved. Moreover, due to the high strength of the slow-running crankshaft, and further due to the distribution of the planet wheel shafts on the maximum diameter and due to the high hardness of the crankshaft system, there is achieved a high short-term torque loading capacity of the gear system which can exceed seven times the regular load. By means of the above advantages, such as removal of a non-linear rigidity of the transmission together with high rigidity and optimum dynamic balance of the rotating parts, a high degree of stability of the gear system is achieved. A substantial advantage of the multisatellite gear system is its technical simplicity and extremely low outlay on manufacture, which result from its simplicity of structure. The structure includes no complicated surfaces or shapes which would regularly require special machining technology. The construction rather requires simple geometric surfaces. In addition, the slow-running shaft comprises three separate portions of the left-hand and of the right-hand flange, which are either identical or extremely closely related, and connecting members with simple shapes. This conception has considerably simplified manufacture of a slow-running shaft, high strength of the slow-running shaft being achieved. Characteristic features of the gear system:

When non-slip toothing is used, a minimum degree of play which is guaranteed during the entire life span, and extremely low energy losses may be achieved, because all important types of sliding friction have been removed in the gear system. Single-stage multisatellite gear systems are produced over a wide range of transmissions, namely from 1 to 6 to 1 to 300. These operate in a wide r.p.m. range, i.e. from almost zero revolutions up to revolutions which are defined by the upper r.p.m. of the faster running bearings. The overall dimensions of the gear system are defined by the individual components and by the opportunity of minimising components. The gear system runs extremely quietly over the entire r.p.m. range, thus removing a source of noise. Two embodiments of the invention, given by way of example, are schematically shown in the drawing and will be described in more detail in the following. Shown are:

Figure 1:
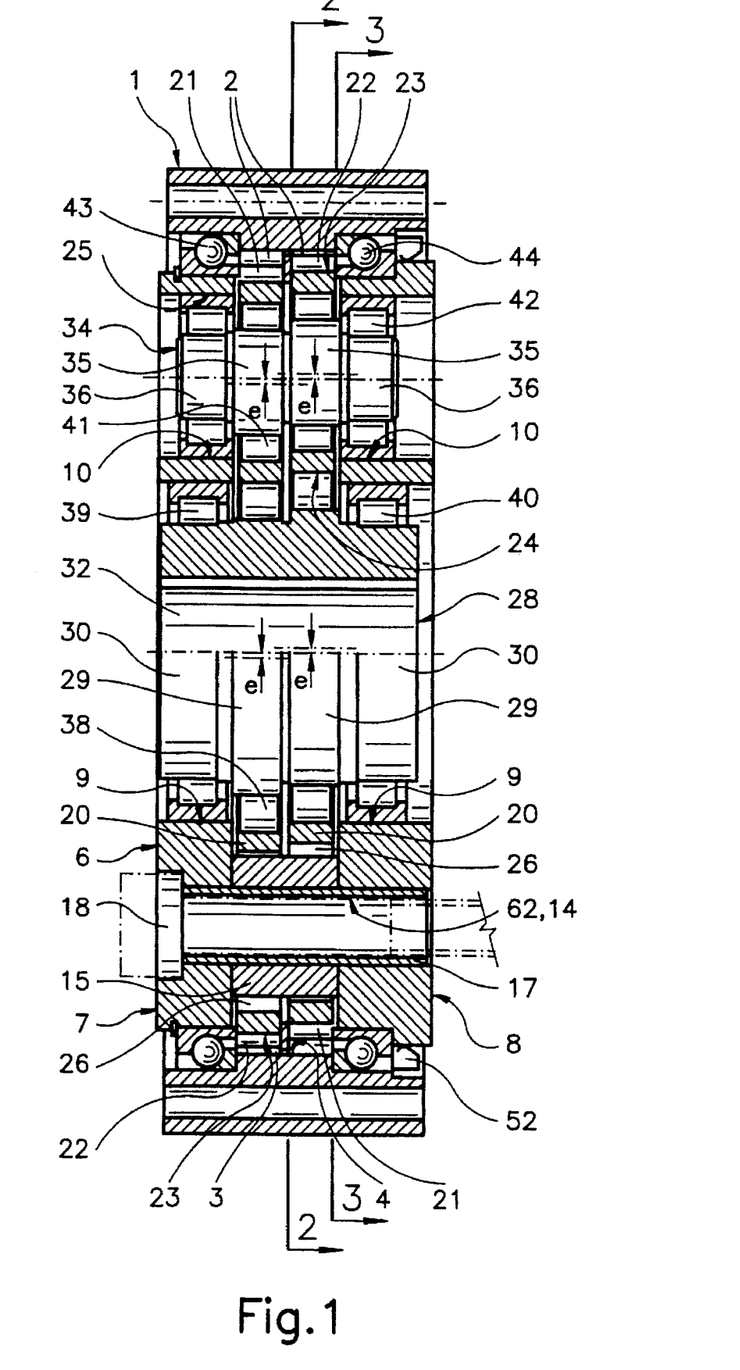
FIG. 1 a cross-section through two radial planes of which one passes through the axis of the planet wheel shaft and simultaneously through the central medial axis of the gear system, while the second sectional plane passes through the central axis of the gear system and through the axis of the connecting member.
Figure 2:
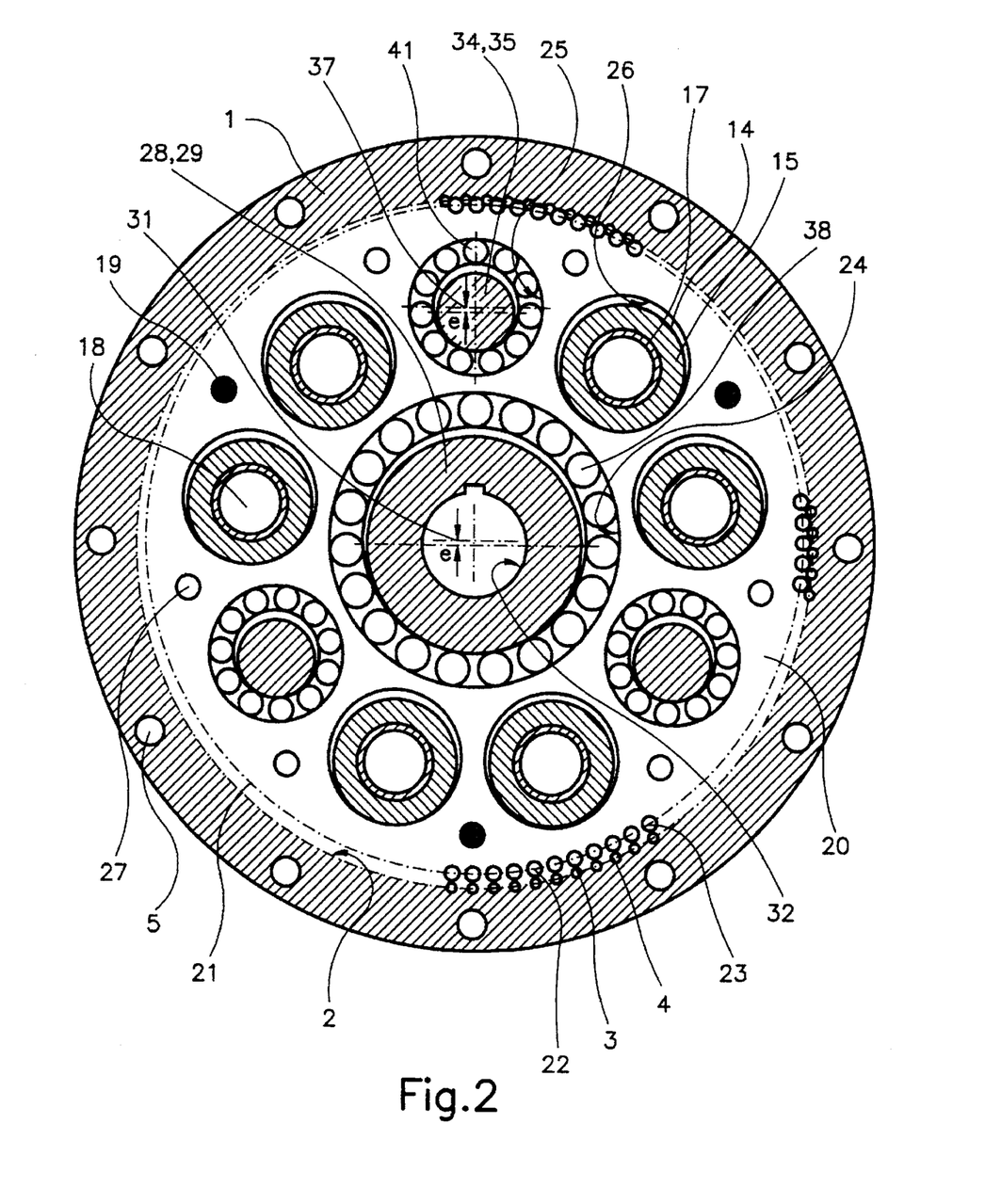
FIG. 2 a cross-section along line 2—2 according to FIG. 1.
Figure 3:
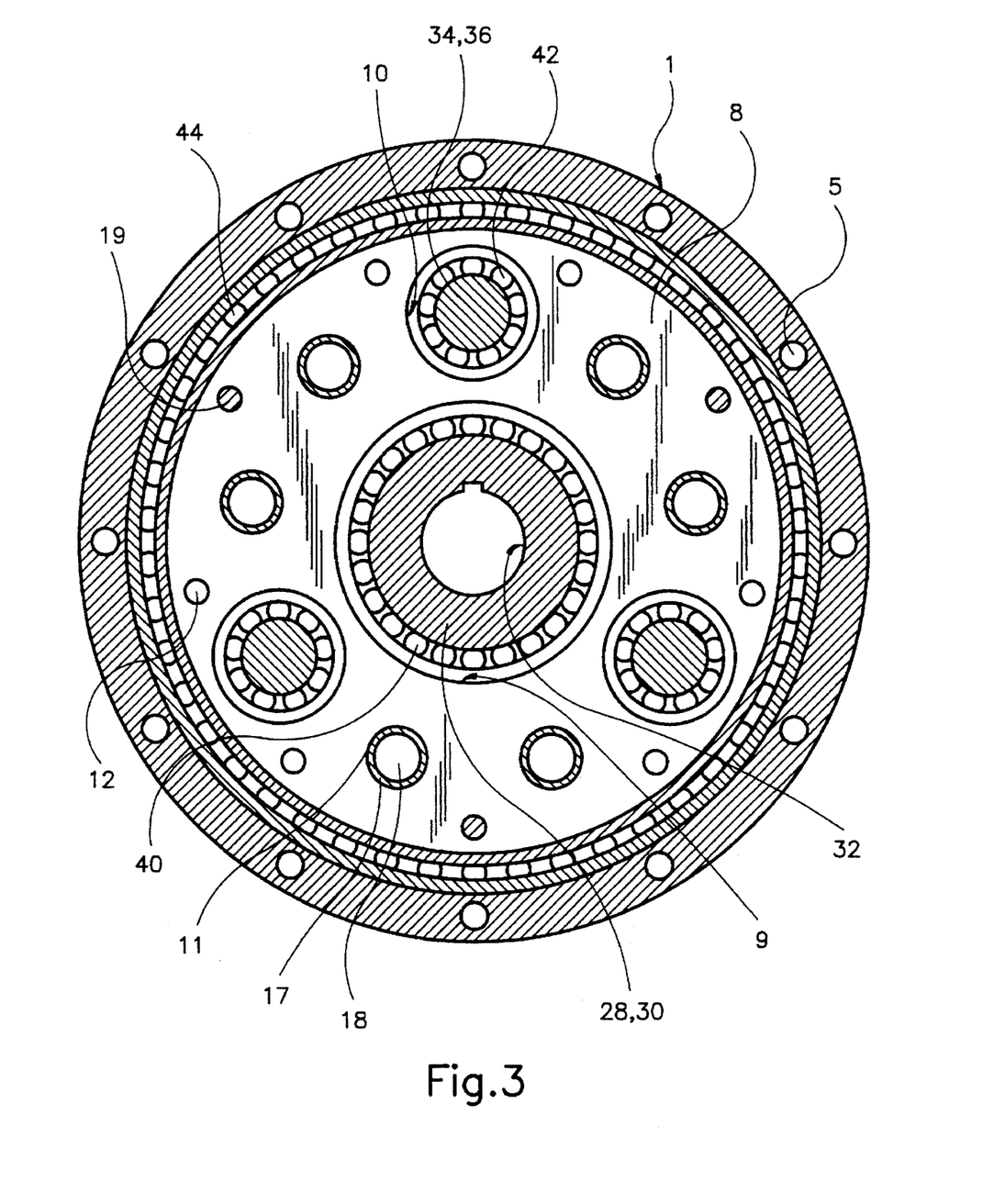
FIG. 3 a cross-section along line 3—3 according to FIG. 1.
Figure 4A:
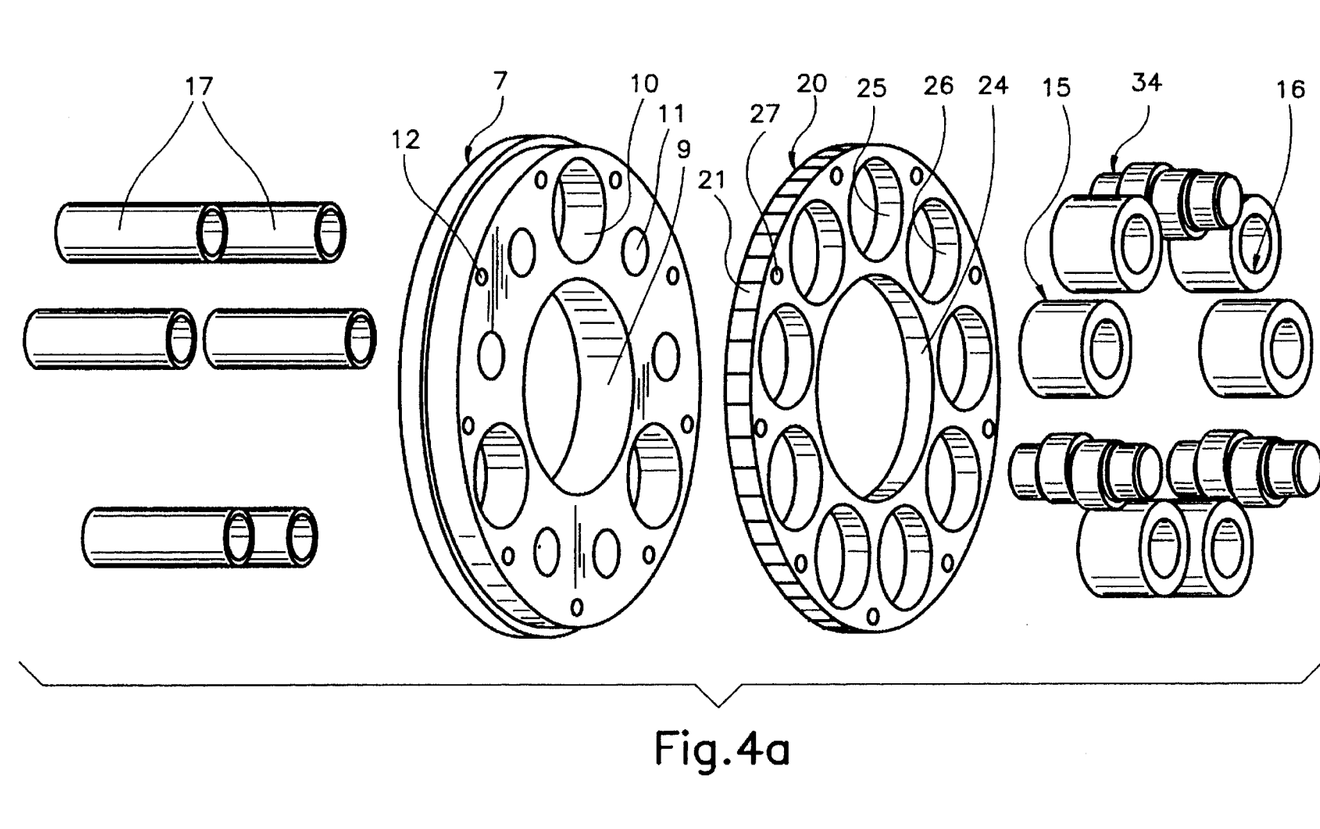
FIG. 4a, 4b portions of the multisatellite gear system in an exploded view.
Figure 4B:
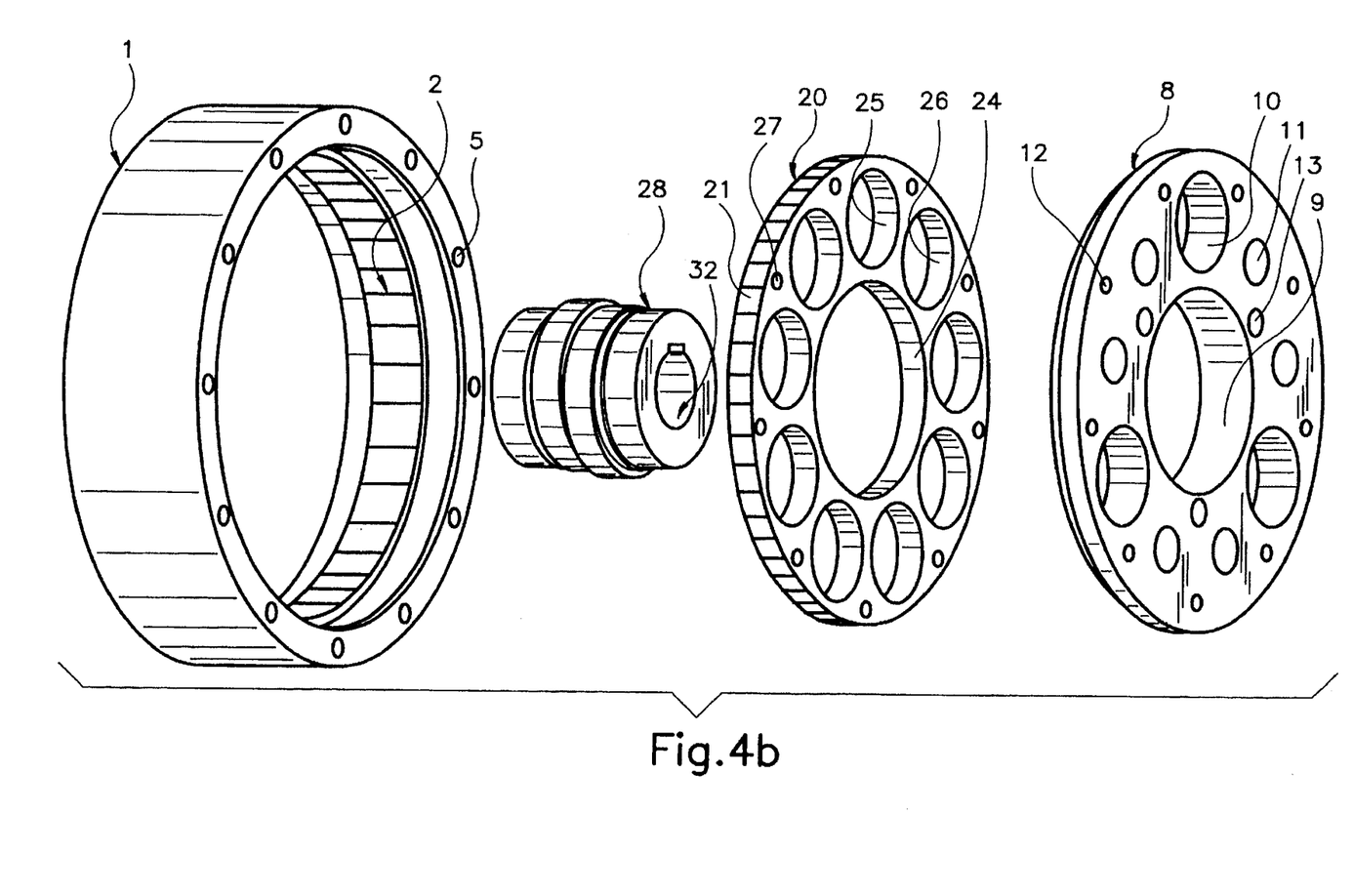

In FIG. 1, the gearwheel 1 is provided with an internal toothing 2 and anchor openings 5. In gearwheel 1 the slow-running planet wheel carrier 6 is mounted, providing oblique-angled contact, at both sides in slow-running ball bearings 43, 44. The slow-running planet wheel carrier 6 comprises a left-hand flange 7, a right-hand flange 8 and axial connector members 62, by means of which the flanges 7, 8 may be securely interconnected. Each flange 7 and 8 has a central continuous opening 9, three continuous central satellite apertures 10 and six continuous cylindrical anchor openings 11, which are uniformly distributed on a circle of distribution. Both flanges 7, 8 are interconnected by three connecting screws 19. The screws 19 pass through technological openings 12. The right-hand flange 8 has threaded openings 13. The axial connecting members 62 comprise 20 connecting means 14. The connecting means 14 comprise a spacer lining 50, a fixing tube 7 and an anchor screw 18, which interconnect the two flanges. The fixing tube 17 has a slightly larger circumference and is pressed into the anchor opening 11 of the left-hand flange 7, in the opening 16 of the spacer lining 15, and in the anchor opening 11 of the right-hand flange 8. The slow-running planet wheel carrier 6 can also exist in other embodiments. In one of the embodiments the standard connecting means 14 is replaced by a simple connecting means 45, in which the fixing tube 17 and the anchor tube 18 are replaced by a set screw 46. In another embodiment, two connecting means 14 or two simple connecting members 45 are replaced by a compact connecting means 47 formed by a stop means 48, an anchor screw 18, a pin 49 and a fixing screw 19.

Disposed between the two flanges 7 and 8 of the slow-running planet wheel carrier 6 are planet wheels 2 with external toothing 21. Each planet wheel 20 is respectively provided with a continuous central cylindrical opening 24 with three continuous cylindrical satellite openings 25 which are disposed on a circle of distribution and are uniformly distributed on a circle of distribution with six continuous cylindrical openings boreholes 26. The passage opening 26 of the planet wheel 20 is so selected that upon offering the planet wheel to the connecting means 14, and during the eccentric movement of the planet wheel 20, the necessary degree of play is observed between the circumference of the connecting means 14 and the continuous openings 26. The planet wheels 20 have technological openings 27 through which are passed fixing screws 19 with a degree of play. The satellite openings 10 of the left-hand flange 7, the satellite openings 25 of the planet wheel 20 and the satellite openings 10 of the right-hand flange 8 are disposed on identical central circles of distribution and are thus distributed in identical ways. The anchor apertures 11 of the left-hand flange 7, the continuous openings 26 in planet wheel 7 and the anchor apertures 11 of the right-hand flange 8 are disposed on identical central circles of distribution, have a uniform distribution and are disposed in pairs between two satellite openings.

Figure 5:
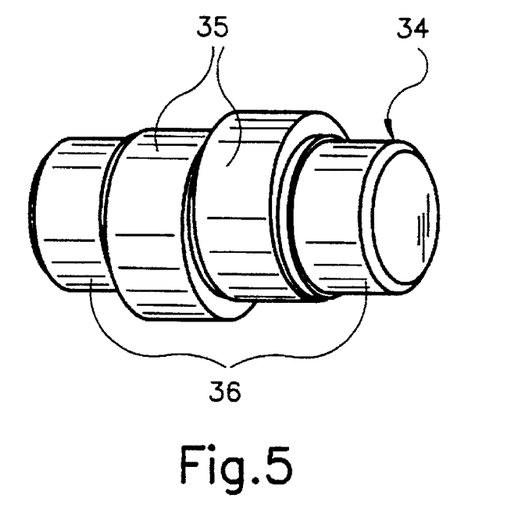
FIG. 5 an enlarged view of a planet wheel shaft.
Figure 6:
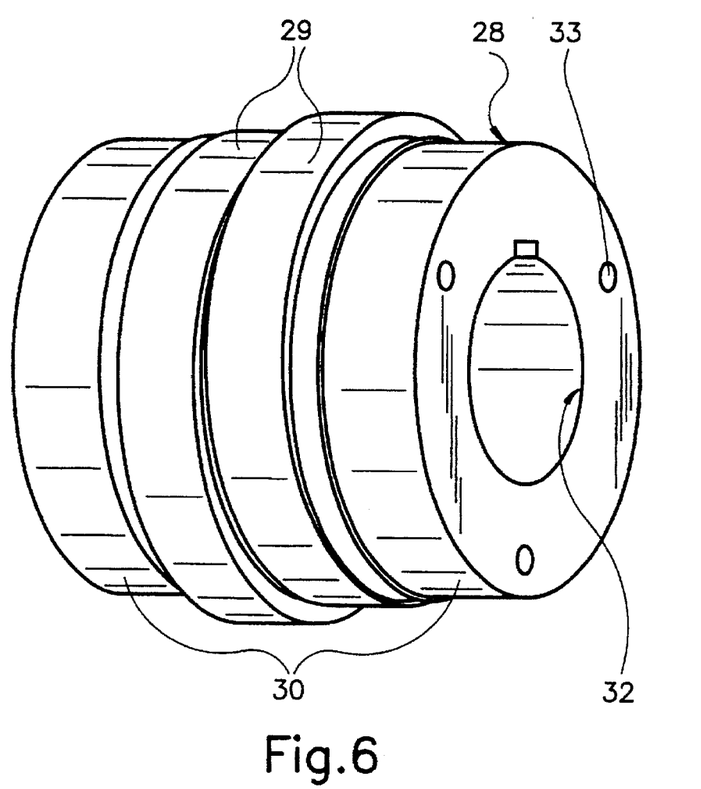
FIG. 6 an enlarged view of a central crankshaft.

The central input shaft 28 is rotarily mounted via its central portions 30 in a central opening 9 of the left-hand flange, and in a central opening 9 of the right-hand flange by means of central bearings 39 and 40. The planet wheels 20 are rotarily mounted in central openings 24 by means of crank bearings 38 at the portions 29 of the central input shaft 28, which are formed by two eccentric cylinders with opposing degrees of eccentricity. The internal portion of the central input shaft 28 is formed by a continuous crank opening 32, which has a groove for a spring. Formed at the face edge of the central crank 28 there are threaded openings 33 on a circle of distribution. Another embodiment of the multisatellite gear system has an externally disposed central input shaft 28, which is disposed by means of a crank opening 32 on the crank of the rotor of a drive system, which has its own bearings. In this way at least one of the central bearings 39 and 40 with its associated bearing surfaces is eliminated. the planet wheel shaft 34 is rotarily mounted at both its sides via central portions 36, in satellite openings 10 of the left-hand flange 7 and in satellite openings 10 of the right-hand flange 8 via central bearings 42. The portions 35 of the planet wheel shafts 34 formed from two eccentric cylinders with opposed degrees of eccentricity 37, are rotarily mounted in satellite openings 25 of the planet wheel 20 via crank bearings 41. The gearwheel pair formed of the gearwheel 1 with internal toothing 2 and the planet wheel 20 with external toothing 21, is provided with a cylindrical (roller) toothing. The internal toothing 2 of the gearwheel 1 forms entrainment means 3, which are mounted in recesses 4 and are uniformly distributed on a circle of distribution. The external toothing 21 of the planet wheel 20 forms entrainment means 22, which are disposed in bearings 23 and are uniformly distributed on a circle of distribution. The magnitude of the eccentricity 31 of the central input shaft 28, and the eccentricity 37 of the satellite crankshafts 34 are of the same size in a radial cutting plane and correspond to the spacing between the axis of the above pair of gearwheels. In order to minimise the undesired viscous friction between two associated surfaces of the planet wheel, these surfaces are separated by a ring 50. Adjacent planar surfaces of the planet wheel 20 and of the left-hand flange 7 and of the planet wheel 20 and of the right-hand flange 8 are separated by setting surfaces of the inner rings of slow-running bearings 43, 44. Initial tension in the slow-running bearings 43 and 44 is achieved by a securing base 51. In order to prevent dirt from penetrating into the gear system, the latter is fitted with rubber seal members 52.

Figure 7:
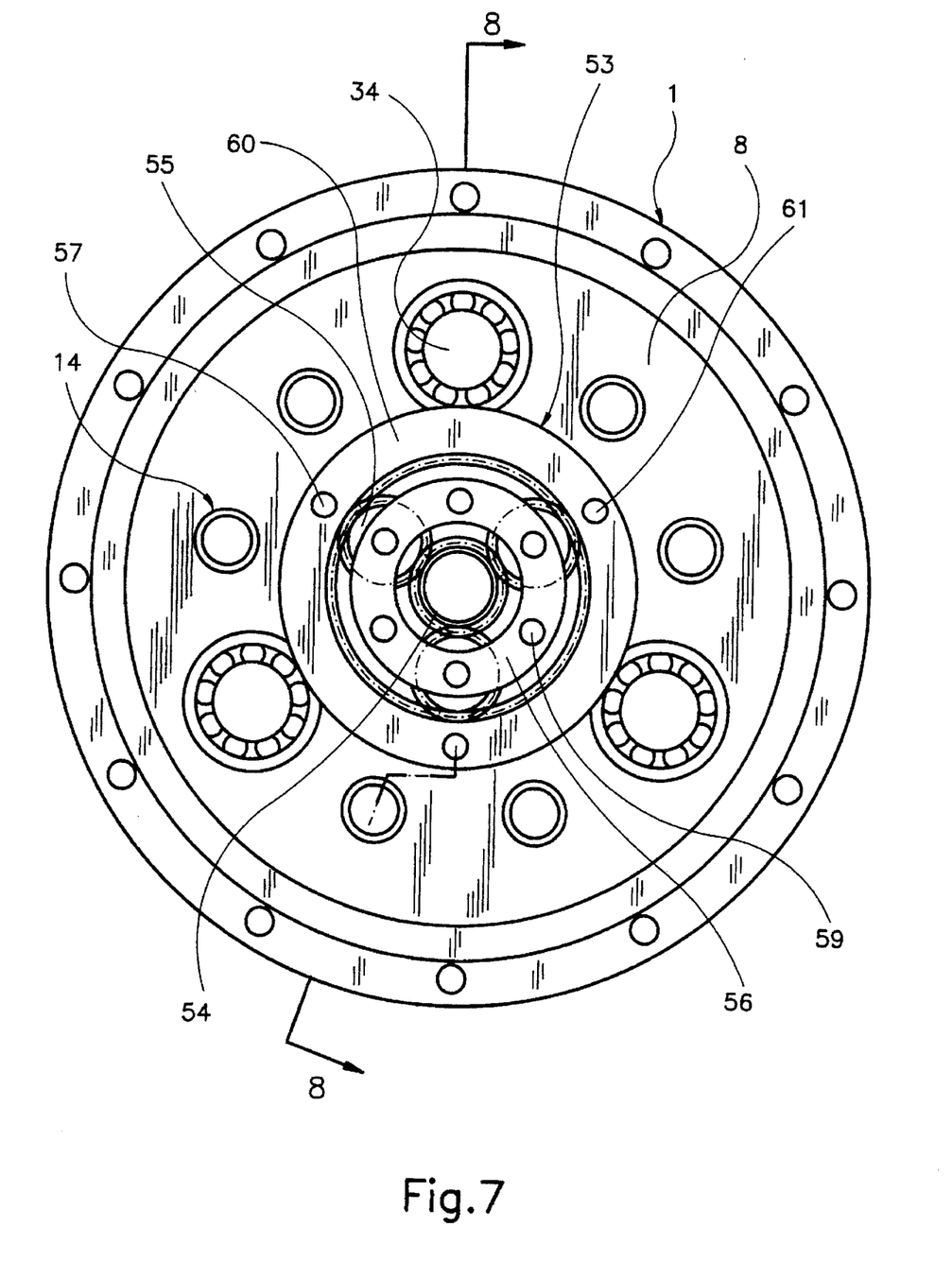
FIG. 7 an axial elevation of a gearwheel intermediate gear.
Figure 8:
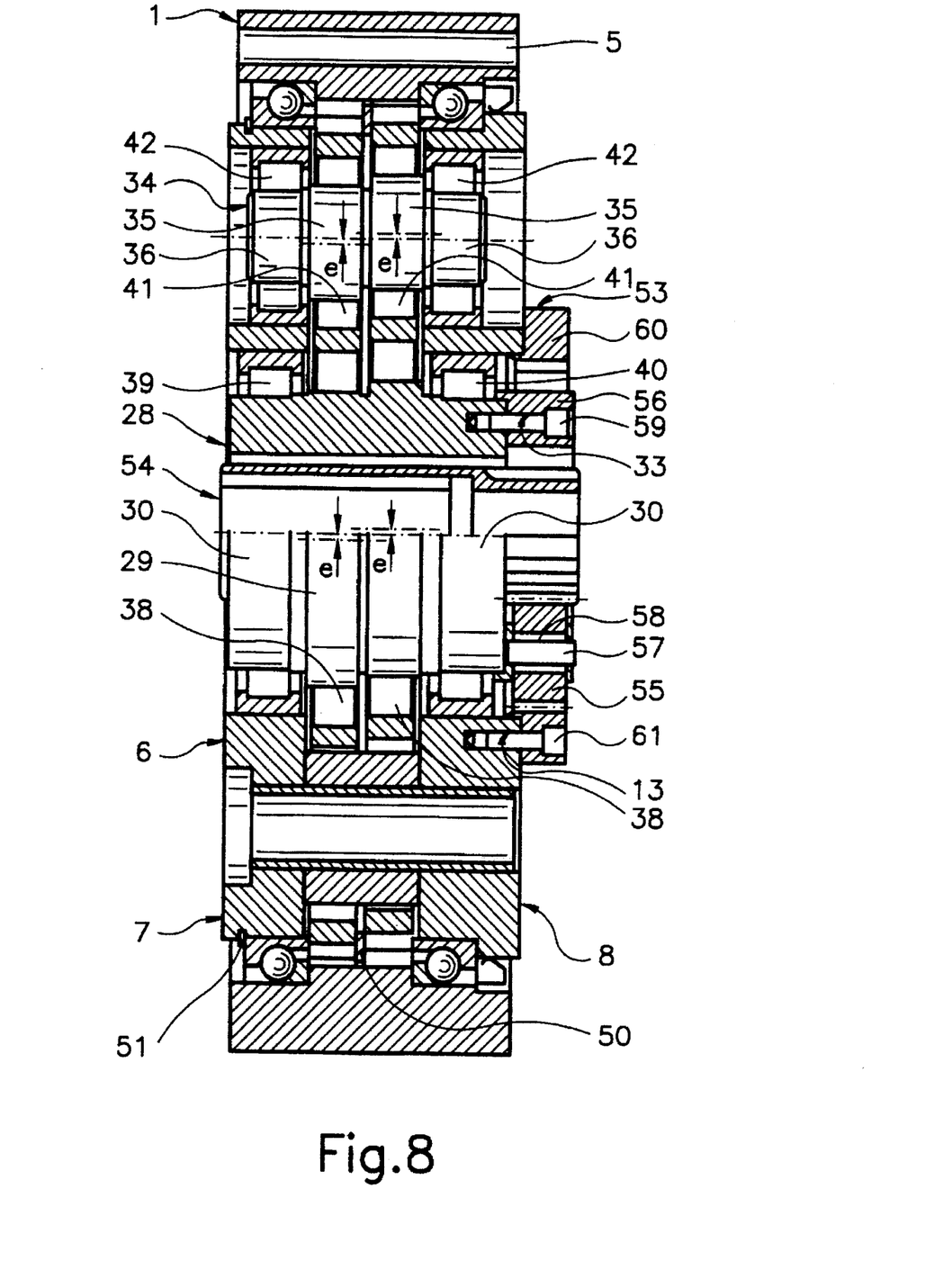
FIG. 8 a cross-section along 8—8 according to FIG. 7.
Figure 9:
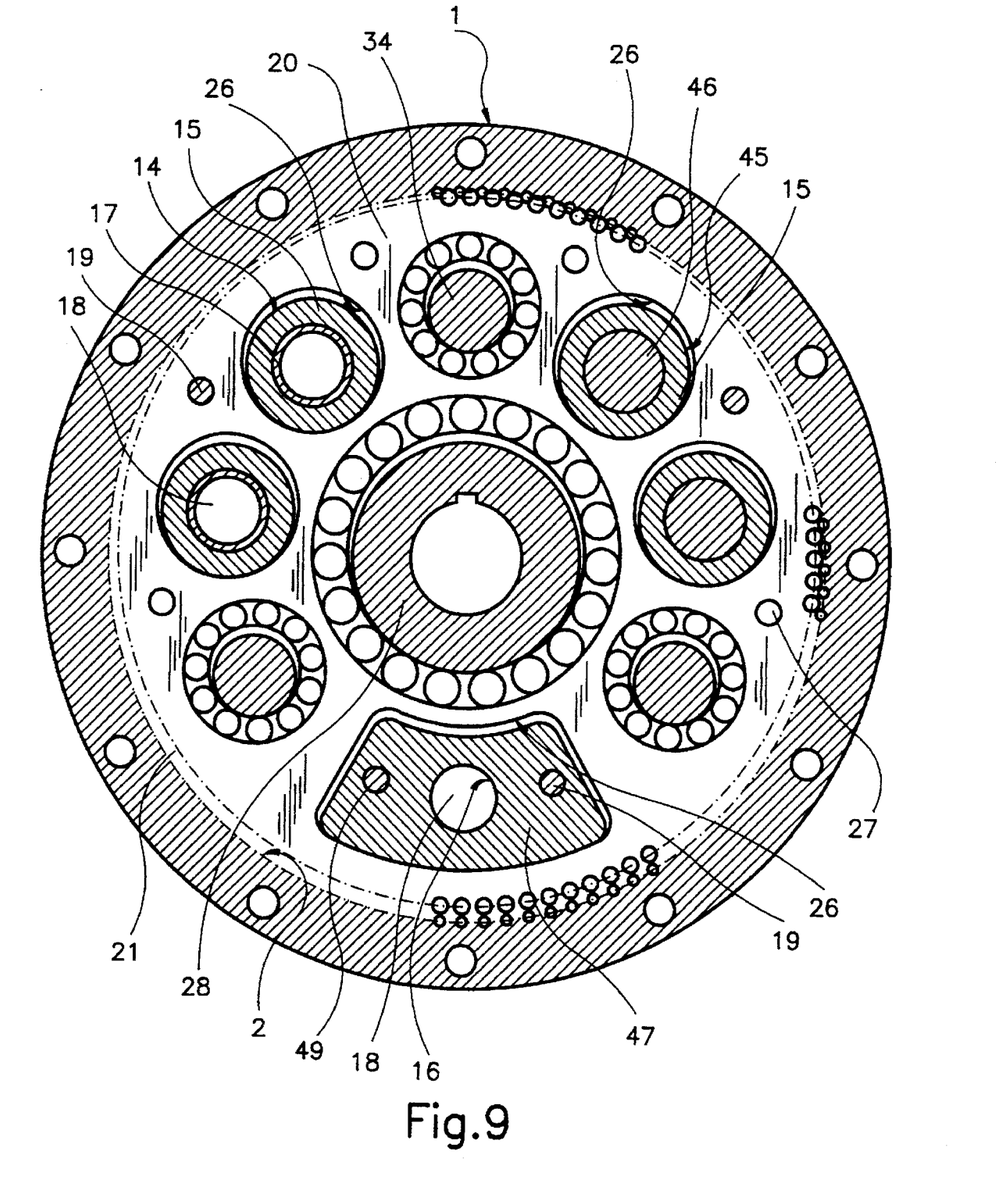
FIG. 9 a radial section of the gearwheel intermediate gear according to FIG. 8 and FIGS. 10 and 11: cross-sections through connecting members of the slow-running shaft.
Figure 10:
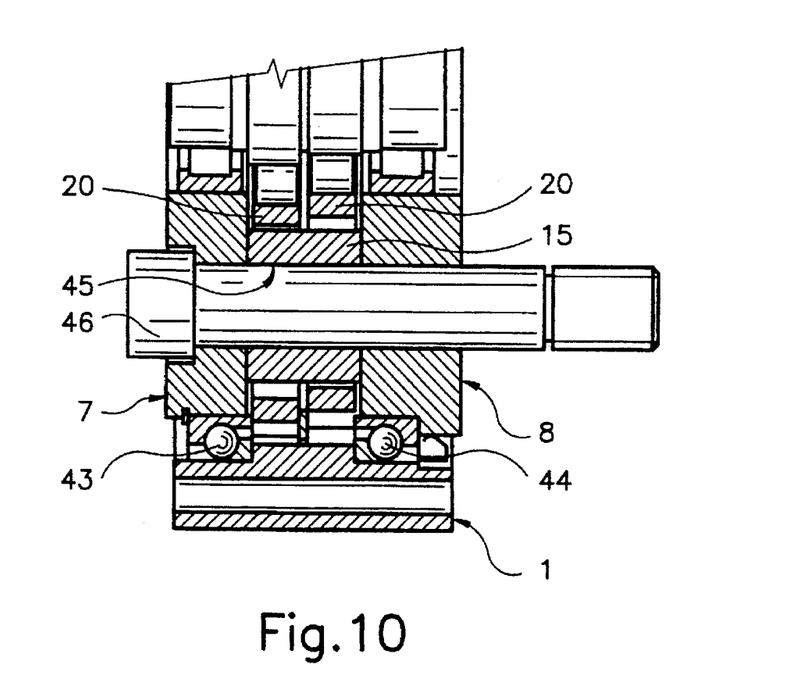
Figure 11:
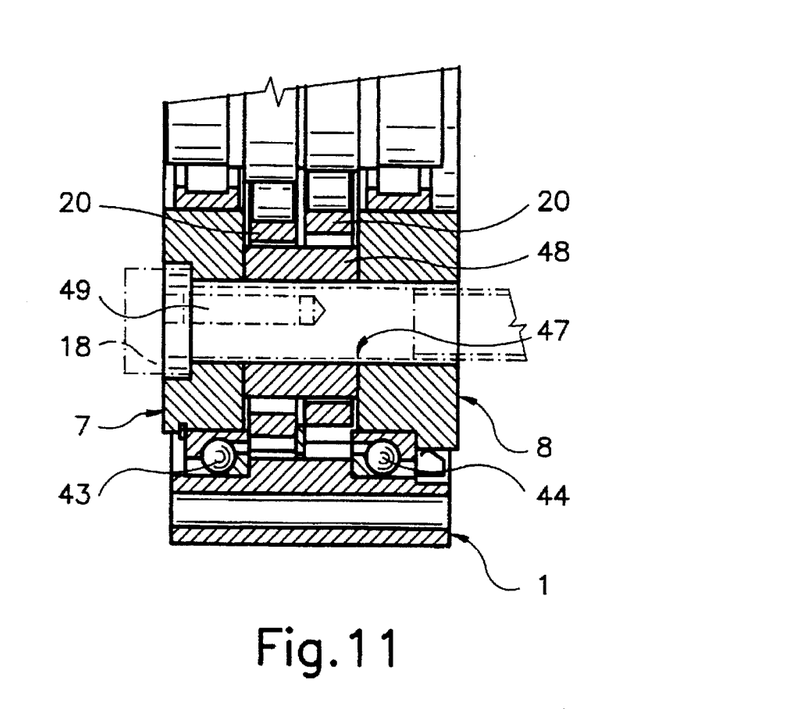

If required, the gear system is fitted with a intermediate gear 53 with the previous toothing, forming an independent unit and being compatible with the multisatellite gear system. The intermediate gear 53 is fitted with a fast running planet wheel 54, which meshes with satellite gearwheels 55. These gearwheels 55 are rotarily mounted via satellite bearings 58 on the pins 57. The pins 57 are supported at both ends in the entrainment means 56, the entrainment means 56 being securely connected to the central input shaft 28 by screws of the entrainment means 59. The satellite gearwheels 55 co-operate with a ring gear 61, which is securely connected via screws of the ring gear 61 to the right-hand flange 8 of the slow-running planet wheel carrier 6. By means of rotation of the central input shaft 28 there is a transformation of the high-speed rotary movement of the central input shaft 28 into a high-speed eccentric movement of the planet wheel 20. The planet wheel 20 thus operates via the external toothing 21 with the internal toothing 2 of the gearwheel 1. By means of this connection the planet wheel 28 is compelled to execute slow-running rotary movements which are dependent on the magnitude of the difference between the rolling circles of the gearwheel pair. This high-speed eccentric movement and simultaneous slow-running rotary movement of the planet wheel 20 is transformed with the aid of the planet wheel shafts 34 in an inverse way into a slow-running rotary movement of the slow-running planet wheel carrier 6. The gear system proposed may be used with advantage in various areas of application, e.g. in manipulators, rotary tables, machine tools, navigation systems, aero and space engine reducers, mining machinery, and elevators. The multisatellite gear system may be used with particular advantage where there are special requirements for high kinetic precision, stability of running, minimum play and low energy losses.

I claim:

1. Gear system for transmission of rotary movements, more particularly a multisatellite gear system with a driven gearwheel (1) with an internal toothing (2), which meshes with an external toothing (21) of at least one driving gearwheel (20), and with a slow-running crankshaft (6), which is rotarily mounted in the gearwheel (1) via slow-running bearings, characterized in that the crankshaft (6) has a left-hand and a right hand flange (7, 8) with satellite openings (10), in that the flanges (7, 8) are connected together non-rotarily via axially extending connecting members (62), in that planet wheel shafts (34) each having at least one eccentric cylinder (35) are rotarily mounted via their central portions (36) in the satellite openings (10), in that a central crankshaft (28) is mounted in the gearwheel (1), in that at least one gearwheel (20) with satellite openings (25) is mounted via its central opening (24) on the portion (29) of the central crankshaft (28), and in that said eccentric cylinder (35) of the planet wheel shafts (34) are rotarily mounted in the satellite openings (25).

2. Gear system according to claim 1, characterized in that the gearwheel (20) has boreholes (26), and in that both the central opening (24) and also the satellite openings (25), disposed in a circle, have a circular cross-section.

3. Gear system according to one of claim 1, characterised in that the flanges (7, 8) have anchor apertures (11), in that at least one of the flanges (7, 8) has a circular central opening (9), and in that the satellite openings (10) disposed in a circle, have a circular cross-section.

4. Gear system according to claim 1, characterized in that the central crankshaft (28) is rotarily mounted via its central portion (30) in at least one of the central opening (9) of the left-hand flange (7) and the central opening (9) of the right-hand flange (8).

5. Gear system according to one of claim 1, characterised in that the axial connecting member (62) of the slow-running crankshaft (6) form connecting means (14) comprising a spacing liner (15) a fixing tube (17) and an anchor screw (18).

6. Gear system according to one of claim 1, characterised in that the axial connecting members (62) of the slow-running crankshaft (6) form simple connecting means (45) comprising a spacing liner (15) and a set screw (46).

7. Gear system for transmission of rotary movements, more particularly a multisatellite gear system with a driven gearwheel (1) with an internal toothing (2), which meshes with an external toothing (21) of at least one driving gearwheel (20), and with a slow-running crankshaft (6), which is rotarily mounted in the gearwheel (1) via slow-running bearings, characterized in that the crankshaft (6) has a left-hand and a right hand flange (7, 8) with satellite openings (10), in that the flanges (7, 8) are connected together non-rotarily via axially extending connecting members (62), in that planet wheel shafts (34) each having at least one eccentric cylinder (35) are rotarily mounted via their central portions (36) in the satellite openings (10), in that a central crankshaft (28) is mounted in the gearwheel (1), in that at least one gearwheel (20) with satellite openings (25) is mounted via its central opening (24) on the portion (29) of the central crankshaft (28), and in that said eccentric cylinder (35) of the planet wheel shafts (34) are rotarily mounted in the satellite openings (25); wherein the connecting members (62) of the slow-running crankshaft (6) form compact connecting means (47) comprising a stop means (48) with the profile of an intermediate segment of a circle, and at least one anchor aperture (11), both flanges (7, 8) being non-rotarily interconnectable with the stop means (48) by a pin (49), a screw (19) and an anchor screw (18).

8. Gear system for transmission of rotary movements, more particularly a multisatellite gear system with a driven gearwheel (1) with an internal toothing (2), which meshes with an external toothing (21) of at least one driving gearwheel (20), and with a slow-running crankshaft (6), which is rotarily mounted in the gearwheel (1) via slow-running bearings, characterized in that the crankshaft (6) has a left-hand and a right hand flange (7, 8) with satellite openings (10), in that the flanges (7, 8) are connected together non-rotarily via axially extending connecting members (62), in that planet wheel shafts (34) each having at least one eccentric cylinder (35) are rotarily mounted via their central portions (36) in the satellite openings (10), in that a central crankshaft (28) is mounted in the gearwheel (1), in that at least one gearwheel (20) with satellite openings (25) is mounted via its central opening (24) on the portion (29) of the central crankshaft (28), and in that said eccentric cylinder (35) of the planet wheel shafts (34) are rotarily mounted in the satellite openings (25); wherein the satellite openings (10) in the left-hand flange (7), the satellite openings (25) of the gearwheel (20), and the satellite openings (10) of the right-hand flange (8) are disposed on identical circles with an identical distribution, the boreholes (26) in the gearwheel (20) being disposed between two satellite openings (25) in the gearwheel (20), while the connecting members (62) of the slow-running crankshaft (6) being disposed respectively between two planet wheel shafts (34).

9. Gear system for transmission of rotary movements, more particularly a multisatellite gear system with a driven gearwheel (1) with an internal toothing (2), which meshes with an external toothing (21) of at least one driving gearwheel (20), and with a slow-running crankshaft (6), which is rotarily mounted in the gearwheel (1) via slow-running bearings, characterized in that the crankshaft (6) has a left-hand and a right hand flange (7, 8) with satellite openings (10), in that the flanges (7, 8) are connected together non-rotarily via axially extending connecting members (62), in that planet wheel shafts (34) each having at least one eccentric cylinder (35) are rotarily mounted via their central portions (36) in the satellite openings (10), in that a central crankshaft (28) is mounted in the gearwheel (1), in that at least one gearwheel (20) with satellite openings (25) is mounted via its central opening (24) on the portion (29) of the central crankshaft (28), and in that said eccentric cylinder (35) of the planet wheel shafts (34) are rotarily mounted in the satellite openings (25); wherein an intermediate gear (53), comprising a high-speed planet wheel (54) co-operating with the satellite gearwheels (55), the satellite gearwheels (55) being mounted by means of satellite bearings (58) on pins (57) being carried by the entrainment means (56) and the entrainment means (56) being connected to the central crankshaft (28), whereas the satellite gearwheels (55) co-operate with a ring gear (60) which is rigidly connected to the right-hand flange (8).

10. Gear system for transmission of rotary movements, more particularly a multisatellite gear system comprising:

a driven gearwheel with an internal toothing;

a central crankshaft having at least one eccentric portion, wherein the central crankshaft is rotarily mounted in the driven gearwheel;

at least one driving gearwheel having a central opening and gearwheel satellite openings and having an external toothing meshing with the internal toothing of the driven gearwheel, wherein said driving gearwheel is rotarily mounted on said eccentric portion of the central crankshaft by the central opening;

a slow-running crankshaft rotarily mounted in the driven gearwheel via slow-running bearings and having a left-hand flange and a right-hand flange connected together non-rotarily via axially extending connecting members, each of the left-hand flange and the right-hand flange having satellite openings; and planet wheel shafts, each having central portions and at least one eccentric cylinder wherein the planet wheel shafts are rotarily mounted with the central portions in the satellite openings of the right-hand flange and the left-hand flange and are rotarily mounted with said eccentric cylinder in the gearwheel satellite openings of said driving gearwheel wherein motion of the central crankshaft is transmitted via said driving gearwheel to the driven gearwheel.

11. Gear system according to claim 1, wherein a magnitude of an eccentricity of said eccentric portion of the central crankshaft is equal a magnitude of an eccentricity of said eccentric cylinder of the planet wheel shafts.

* * * * *